J. C. ROGERS.
Wheel Plow.
No. 65,834.
Patented June 18, 1867.
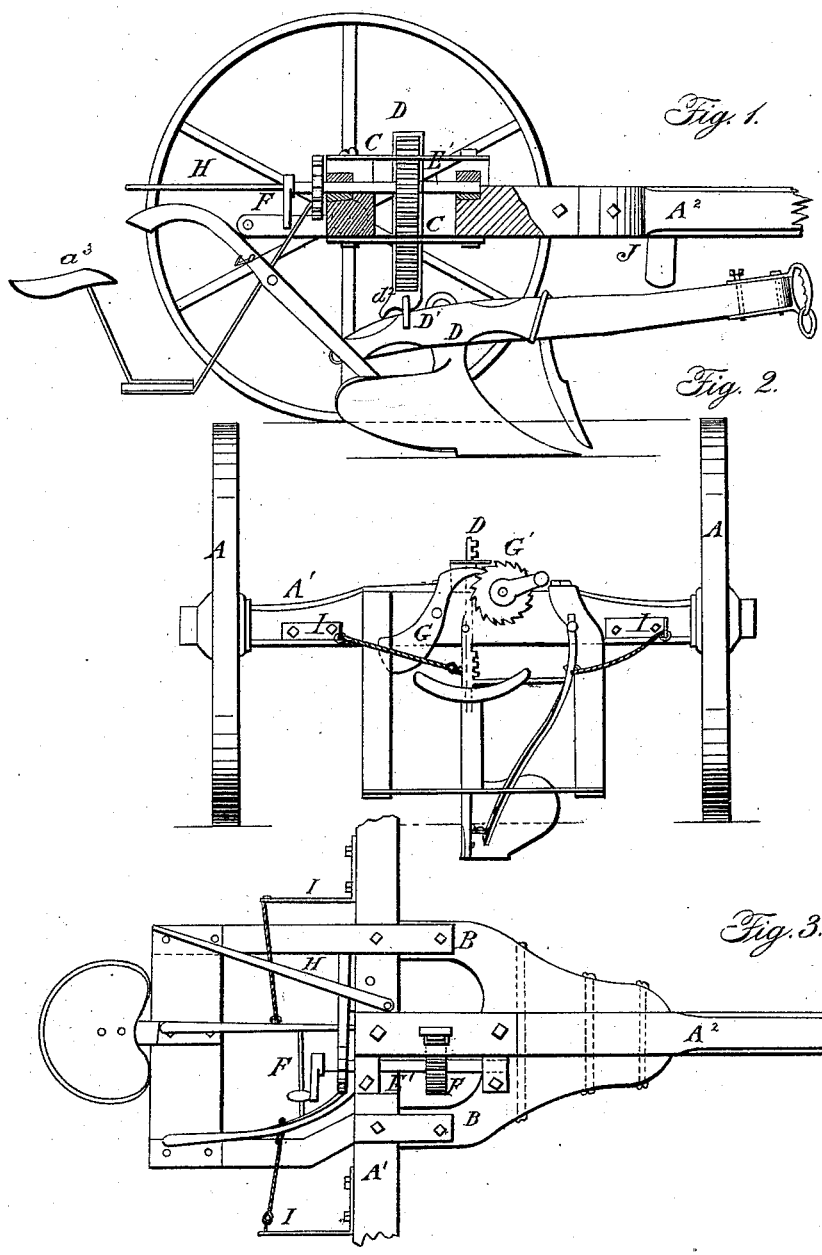

United States Patent Office.

JOHN C. ROGERS, OF ALDEN, NEW YORK.

*Letters Patent No. 65,834, dated June 18, 1867*

SULKY-PLOUGH.

*The Schedule referred to in these Letters Patent and making part of the same.*

TO ALL WHOM IT MAY CONCERN:

Be it known that I, JOHN C. ROGERS, of Alden, in the county of Erie, and State of New York, have invented a certain new and improved Sulky-Plough; and I do hereby declare that the following is a full and exact description thereof, reference being had to the accompanying drawings, making a part of this specification, in which—

Figure I is a sectional side elevation.

Figure II is a rear end elevation.

Figure III is a plan view.

The nature of this invention consists—

First, in connecting a plough to the axle or other parts of a sulky by means of a link or universal joint, and attaching the horses directly to the plough-beam in a common manner, so that the driver, though riding upon the sulky, may still be enabled to direct the action and various movements of the plough as easily and with greater convenience than if he were walking behind the plough and independent of the movements of the sulky.

Second, in attaching the plough, by means of the link or universal joint aforesaid, to the lower end of a rack sliding vertically within guide-bars connected to the frame or the futchels of the sulky, in combination with a pinion gearing with said rack, and supported upon a horizontal shaft having a crank-wheel at its rear end, within convenient reach of the driver, as a means of raising and suspending the plough above the surface of the ground while turning around at the end of a furrow or moving the plough from field to field.

Third, in a stop hook or other projection formed at the lower end of the said rack, and in the rear of the said link, for the purpose of raising the plough in a level or balanced position from the ground.

Fourth, in two spring steel-rods attached to and projecting horizontally from the rear of the axle of the sulky, to which the handles of the plough are connected upon both sides by means of a rope or chain.

Fifth, in a device for holding the plough-beam when the plough is raised from the ground to the pole of the sulky, and preventing a lateral movement of the plough independent of the sulky.

Letters of like name and kind refer to like parts in each of the figures.

A $A^1$ $A^2$ represents the sulky, A being the wheels, $A^1$ the axle, and $A^2$ the pole. B B represent the futchels which hold the pole, and which form a rectangular frame near the axle. Across the top and bottom of this frame are bolted the bars or plates C. D represents a rack which slides vertically within appropriate grooves made in the bar C. To the lower end of this rack the plough P is attached by means of the link or universal joint D′. The connection of this link to the plough is made at a point in the middle (or nearly so) of the plough-beam or above the centre of the mould-board. A hook or projection, $d^2$, is formed upon the lower end of the rack, directly in rear of the link. This is for the purpose of preventing the plough from tipping forward, and for keeping the same level when it is raised from the ground. E is a pinion supported upon the horizontal shaft $E^1$, having bearings upon the axle $A^1$ and pole $A^2$. The free end of this shaft projecting in the rear of the axle carries a crank or hand-wheel, F, which is placed in convenient proximity to the driver's seat, $a^3$. G represents a weighted pawl or dog, which is hinged to the rear side of the axle and opposite the ratchet-wheel G′ upon the shaft E′. This pawl may be made to engage the teeth of the ratchet-wheel by means of the lever H, which is hinged to the axle of the sulky. The weight of the plough will keep the pawl engaged with the ratchet-wheel, and when it is disengaged the pawl will remain so by reason of its own weight. I I represent two spring steel rods or bars bolted to the axle and projecting from the axle rearwardly, one upon each side of the driver's seat. The plough is connected by ropes or chains to the ends of these spring rods for the purpose of holding the plough in an upright position, so that the driver need not guide the same when ploughing on a straight line. J J are jaws bolted to the under side of the pole above the forward end of the plough-beam. This is for the purpose of keeping the plough-beam in line with the pole when the plough is raised from the ground for transportation from field to field.

The operation of this machine is very simple, and its construction cheap and durable.

The principal advantage which my improved sulky-plough has over other machines of this kind now in use is, that as the horses are attached directly to the plough, the action of the plough is in effect the same as if there were no sulky connected with it, that is to say, instead of the sulky drawing the plough the plough draws the sulky by means of its only connection, the link D′. When the driver wishes to lift the plough from the ground and hold it suspended, he turns the crank, and the rack will be raised between its guides, lifting the plough up with it. By means of the lever the pawl is made to take hold of the ratchet-wheel and prevent its return movement when the crank is released. When the plough is thus suspended the front end of the beam is held between the jaws J in a manner to keep the same in line with the pole, which connects the plough more firmly with the sulky for the purpose of convenient transportation. The projection $d^2$ is very essential in keeping the plough level while it is raised from the ground. It is located in the rear of the connecting link D', because the plough is heavier in front and consequently has a tendency to tilt forward. When the driver wishes to begin ploughing he gives the crank a slight forward turn, which releases the pawl. The shaft is now free to revolve, and the plough, by its own weight, drops to the ground.

Upon the whole, this machine is intended to be the most convenient, efficient, durable, and simple device for relieving the hard labor connected with ploughing ever before constructed and used.

What I claim as my invention, and desire to secure by Letters Patent, is—

1. Connecting a sulky to a plough by means of the link or universal joint D', or equivalent, for the purpose and substantially as herein described.

2. The combination and arrangement with a plough of common construction of the rake D, link D', pinion E, crank-shaft $E^1$ F, weighted pawl G, and ratchet-wheel G', all arranged upon a sulky in the manner and for the purpose substantially as herein described.

3. The projection $d^2$, or equivalent, formed upon or connected to the lower end of the rack D, in rear of the link or universal joint D', for the purpose and substantially as described.

4. The spring rods I I, when constructed and used for the purpose substantially as herein set forth.

5. The jaws J, in combination with the pole of a sulky-plough, for the purpose and substantially as described.

JOHN C. ROGERS.

Witnesses:
    EZERIEL WICKS,
    B. H. MUEHLE.